(12) United States Patent
MacNally et al.

(10) Patent No.: US 12,516,743 B2
(45) Date of Patent: Jan. 6, 2026

(54) MULTI-PORT VALVE ASSEMBLY

(71) Applicant: Vitesco Technologies USA, LLC, Auburn Hills, MI (US)

(72) Inventors: Benjamin MacNally, Chatham (CA); Alexander Dragojlov, Chatham (CA); Mitchell Koupal, Pontiac, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 301 days.

(21) Appl. No.: 17/457,513

(22) Filed: Dec. 3, 2021

(65) Prior Publication Data

US 2023/0078460 A1    Mar. 16, 2023

Related U.S. Application Data

(60) Provisional application No. 63/196,805, filed on Jun. 4, 2021.

(51) Int. Cl.
*F16K 11/085* (2006.01)
*F16K 11/087* (2006.01)

(52) U.S. Cl.
CPC ...... *F16K 11/0853* (2013.01); *F16K 11/0873* (2013.01); *Y10T 137/86871* (2015.04)

(58) Field of Classification Search
CPC ............... F16K 11/085; F16K 11/0853; F16K 11/0856; F16K 11/083; F16K 11/0833; F16K 11/0836; F16K 11/087; F16K 11/0873; F16K 11/0876; F16K 11/076; F16K 5/0407; F16K 5/0605; F16K 27/063; F16K 27/065; F16K 27/067; Y10T 137/86566; Y10T 137/86863; Y10T 137/86871

USPC ............... 137/625.43, 625.47, 625.19
See application file for complete search history.

(56) References Cited

U.S. PATENT DOCUMENTS

| | | | |
|---|---|---|---|
| 668,833 A | | 2/1901 | Gilbert |
| 1,295,999 A | * | 3/1919 | Mesna ................ F16K 11/0853 |
| | | | 251/304 |
| 1,422,178 A | * | 7/1922 | Cooley ............... F16K 11/0853 |
| | | | 251/297 |
| 1,534,958 A | * | 4/1925 | Huss ................... F16K 11/0853 |
| | | | 137/625.47 |

(Continued)

FOREIGN PATENT DOCUMENTS

| | | |
|---|---|---|
| CN | 2093285 U | 1/1992 |
| CN | 2198478 Y | 5/1995 |

(Continued)

*Primary Examiner* — Kenneth Rinehart
*Assistant Examiner* — Jonathan J Waddy

(57) ABSTRACT

A coolant flow control valve (CFCV) which includes an actuator having a microcontroller which drives an electric motor, such as a brushless DC motor. The motor drives a gear train, and the gear train drives a valve. The motor and gear train are used to rotate the valve to one or more positions, and thus direct coolant (passing through the valve) between ports. The valve is rotated to different positions to create various flow paths, such that coolant is directed between the different flow paths. The valve is a rotor having three different channels. The CFCV may also include a compound valve, where two valves are connected to and driven by one actuator. The valves may be of different shapes to accommodate inlet and outlet ports of various configurations.

11 Claims, 9 Drawing Sheets

(56) References Cited

U.S. PATENT DOCUMENTS

| | | | | |
|---|---|---|---|---|
| 2,182,459 | A | * | 12/1939 | Vickers .................. F15B 13/04 251/283 |
| 2,485,842 | A | * | 10/1949 | Pennington ......... F16K 11/0853 604/248 |
| 2,623,234 | A | * | 12/1952 | Brown ................ E04D 13/0765 15/352 |
| 3,166,098 | A | * | 1/1965 | Jennings ............. F16K 11/0873 251/367 |
| 3,499,467 | A | | 3/1970 | Mccord |
| 3,630,231 | A | | 12/1971 | Miller |
| 3,927,693 | A | | 12/1975 | Johnston |
| 4,108,207 | A | | 8/1978 | Doody |
| 4,480,662 | A | * | 11/1984 | Garrels ..................... F16K 5/10 137/625.3 |
| 5,445,187 | A | * | 8/1995 | Farquhar ............. F16K 11/0873 137/182 |
| 5,529,758 | A | * | 6/1996 | Houston ............. F16K 11/0853 422/171 |
| 5,687,755 | A | * | 11/1997 | Farquhar ................... F16T 1/38 137/182 |
| 5,829,469 | A | * | 11/1998 | Sileno, Jr. ........... F16K 11/0856 137/98 |
| 5,967,185 | A | | 10/1999 | Baruschke et al. |
| 6,035,882 | A | * | 3/2000 | Brint ........................ F16T 1/48 236/94 |
| 6,295,828 | B1 | | 10/2001 | Koo |
| 6,457,322 | B1 | * | 10/2002 | Kim ..................... F25D 23/126 137/547 |
| 6,539,899 | B1 | | 4/2003 | Piccirilli et al. |
| 7,854,793 | B2 | * | 12/2010 | Rarig ................ B01D 53/0446 96/124 |
| 8,740,186 | B2 | | 6/2014 | Lauridsen |
| 9,212,751 | B2 | | 12/2015 | McLane et al. |
| 9,381,921 | B2 | | 7/2016 | Roudeau et al. |
| 9,382,833 | B2 | | 7/2016 | Morein |
| 9,383,032 | B1 | | 7/2016 | Bhatasana |
| 9,404,594 | B2 | | 8/2016 | Morein |
| 9,500,299 | B2 | | 11/2016 | Morein et al. |
| 9,958,082 | B2 | | 5/2018 | Yu et al. |
| 10,344,877 | B2 | | 7/2019 | Roche et al. |
| 10,458,562 | B2 | | 10/2019 | Ozeki et al. |
| 10,544,725 | B2 | | 1/2020 | Schaefer |
| 10,690,040 | B2 | | 6/2020 | Jang et al. |
| 10,704,453 | B2 | | 7/2020 | Park et al. |
| 10,808,856 | B2 | | 10/2020 | Shen et al. |
| 10,883,619 | B2 | * | 1/2021 | Smith .................. B01D 29/668 |
| 10,927,972 | B2 | | 2/2021 | Murakami |
| 10,968,809 | B2 | | 4/2021 | Yoshimura et al. |
| 10,968,810 | B2 | | 4/2021 | Zhou et al. |
| 2004/0221901 | A1 | * | 11/2004 | Chen .................... F16K 11/0853 137/625.23 |
| 2006/0237359 | A1 | | 10/2006 | Lin et al. |
| 2010/0319796 | A1 | | 12/2010 | Whitaker |
| 2013/0255689 | A1 | * | 10/2013 | Kim .................... A61M 16/201 128/205.24 |
| 2015/0354716 | A1 | | 12/2015 | Morein |
| 2017/0152957 | A1 | | 6/2017 | Roche et al. |
| 2018/0292016 | A1 | * | 10/2018 | Ledvora ................ F16K 5/0471 |
| 2019/0063623 | A1 | * | 2/2019 | Dragojlov ........... F16K 11/0876 |
| 2019/0136724 | A1 | | 5/2019 | Wong |
| 2020/0393053 | A1 | * | 12/2020 | Dragojlov ............. F16K 27/067 |

FOREIGN PATENT DOCUMENTS

| | | |
|---|---|---|
| CN | 201502748 U | 6/2010 |
| CN | 201944338 U | 8/2011 |
| CN | 204729668 U | 10/2015 |
| CN | 205401824 U | 7/2016 |
| EP | 0048680 A1 | 3/1982 |
| EP | 290514 A1 | 11/1988 |
| EP | 3385583 A1 | 10/2018 |
| FR | 2988459 A1 | 9/2013 |
| JP | H246039 A | 2/1990 |
| JP | H828725 A | 2/1996 |
| WO | 2003046342 | 6/2003 |
| WO | 2014052571 A1 | 4/2014 |
| WO | 2015004497 A1 | 1/2015 |

\* cited by examiner

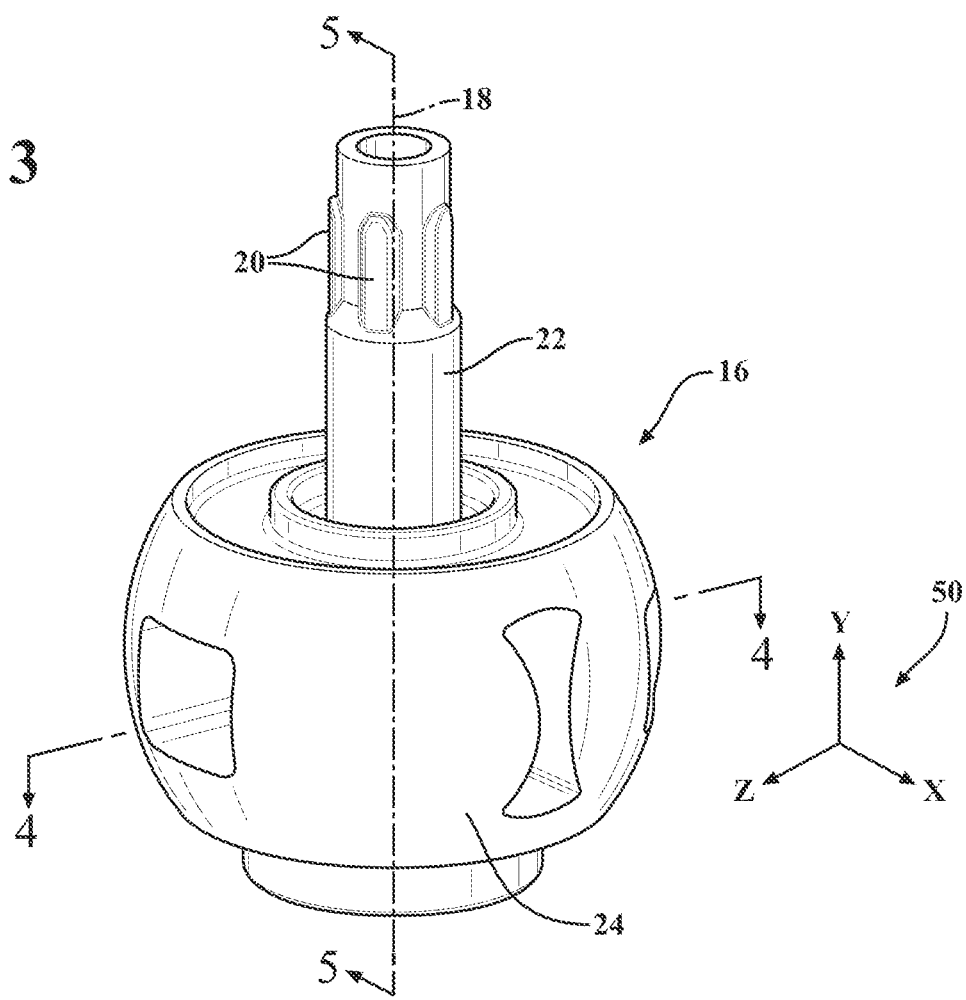
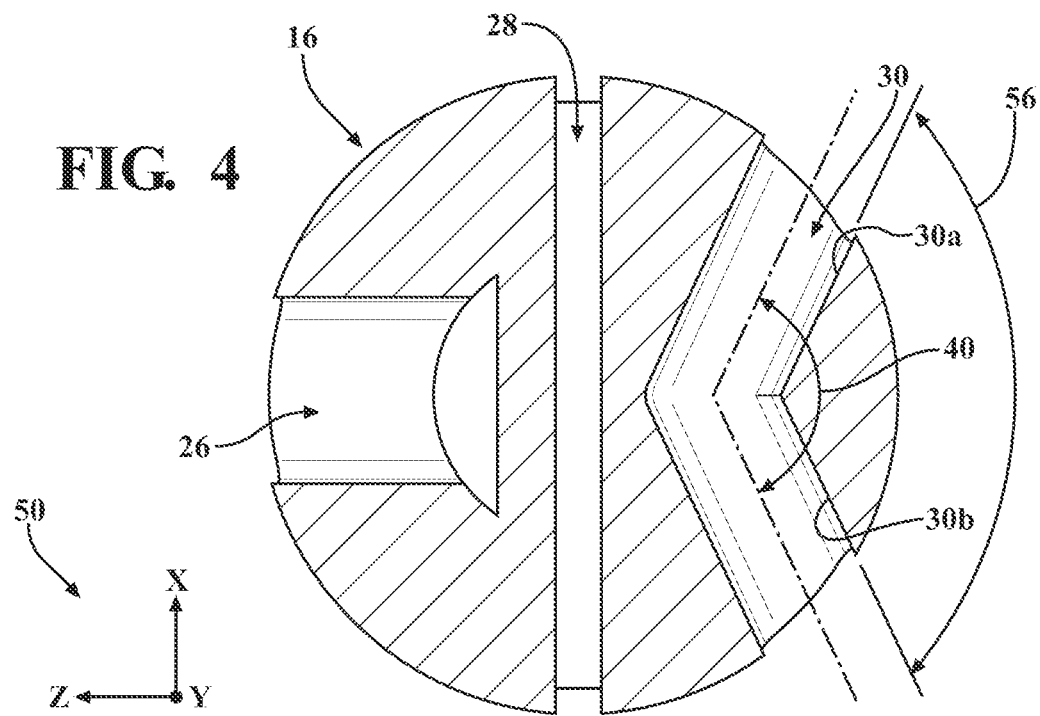

MULTI-PORT VALVE ASSEMBLY

CROSS-REFERENCE TO RELATED APPLICATIONS

This application claims the benefit of provisional application 63/196,805, filed Jun. 4, 2021. The disclosure of the above application is incorporated herein by reference.

FIELD OF THE INVENTION

The invention relates generally to a multi-port valve assembly which includes a rotor having various channels which are used to configure the multi-port valve assembly to have various flow paths between multiple ports.

BACKGROUND OF THE INVENTION

Multi-port valves for directing fluid through various conduits are generally known. Some of the more common types of valve are a three-port valve and a four-port valve, where a single valve member is used to direct fluid from an inlet port to one of several outlet ports. Some multi-port valves include a five-port configuration, where multiple actuators are used to change the configuration of the valve to direct the flow of fluid as desired. However, these valves are expensive, and complex and costly to manufacture.

Accordingly, there exists a need for a multi-port valve assembly which is able to direct flow from an inlet port to multiple outlet ports, which is less complex and is less costly to manufacture.

SUMMARY OF THE INVENTION

In an embodiment, the present invention is a coolant flow control valve (CFCV) which includes an actuator having a microcontroller which drives an electric motor, such as a brushless DC motor. The motor drives a gear train, and the gear train drives a valve. The motor and gear train are used to rotate the valve to one or more positions, and thus direct coolant (passing through the valve) between ports. The valve is rotated to different positions to create various flow paths, such that coolant is directed between the different flow paths.

In an embodiment, the valve is a rotor having three different channels. In other embodiments, the CFCV includes a compound valve, where two valves are connected to and driven by one actuator. In yet other embodiments, the CFCV is of different shapes to accommodate inlet and outlet ports of various configurations.

The design of the valve of the present invention results in the valve having multiple channels, and multiple flow paths, without having a complex design or unnecessary components, compared to a multi-valve design.

In an embodiment, the multi-port valve assembly of the present invention is highly configurable and is applicable for use in a thermal management system in an automobile. The multi-port valve assembly of the present invention includes two sub-assemblies, one sub-assembly being the actuator, and the other sub-assembly being the valve, which has a rotor. The actuator connects to a communication system (most often a LIN bus) of a vehicle and receives commands from the communication system. As a result of the commands, the microcontroller drives the motor to rotate, which in turn drives a gear train. The gear train in turn drives the rotor, fluidically connecting one or more hydraulic pathways, and disconnecting other hydraulic pathways. In an embodiment, the rotor includes three channels, but it is within the scope of the invention that more or less channels may be used. In an embodiment, at least one of the channels is substantially straight through the rotor, and two of the channels have a bend, or "elbow." The straight channel in combination with the channels having an elbow allow the multi-port valve assembly of the present invention to achieve an increased number of flow paths, while also maintaining proper sealing between the paths.

In one configuration, the channels having the elbows are used to connect at least two flow paths which are fluidically isolated from one another, and the straight channel is unused. In another configuration, the straight channel and one of the channels having the elbows are used to connect two flow paths which are fluidically isolated from one another, and the other channel having the elbow is unused.

In an embodiment, the present invention is a multi-port valve assembly, including a housing, a plurality of ports, each of the ports formed as part of the housing, and a rotor disposed in the housing, where the rotor is selectively in fluid communication with at least one of the ports. A plurality of channels is integrally formed as part of the rotor, and at least two flow paths are formed by the orientation of the rotor relative to the housing and the ports. The rotor is placed in one of a plurality of configurations relative to the ports and the housing such that each of the configurations includes the two flow paths using two of the channels.

In an embodiment, a first channel is integrally formed as part of the rotor, a second channel is integrally formed as part of the rotor, and a third channel is also integrally formed as part of the rotor. The first channel, the second channel, and the third channel are fluidically isolated from one another. The rotor is rotated relative to the housing such that one of the flow paths includes two of the first channel, the second channel, or the third channel.

In an embodiment, the first channel includes a first aperture, an intermediate aperture in fluid communication with the first aperture, and a second aperture in fluid communication with the intermediate aperture. The intermediate aperture extends between the first aperture and the second aperture, and the intermediate aperture has a smaller cross-sectional area compared to the first aperture and the second aperture.

In an embodiment, the first aperture extends through the body portion perpendicular to the axis, such that the first aperture is perpendicular to the intermediate aperture and the second aperture. In an embodiment, the intermediate aperture is offset from the axis. In an embodiment, an outer wall extends away from the body portion, and the second aperture extends through the outer wall.

In an embodiment, the second channel includes at least one outer area, and a middle area having a narrower width than the outer area. The second channel is substantially straight and extends through the rotor in between the first channel and the third channel.

In an embodiment, the third channel is an angled channel which provides fluid communication between two of the ports.

In an embodiment, the third channel includes a first aperture integrally formed as part of the body portion, a second aperture integrally formed as part of the body portion, and the first aperture is in fluid communication with the second aperture.

In an embodiment, the a multi-port valve assembly includes at least one seal having an inner radius and an outer radius, and the seal is located in the housing such that the seal is in sliding contact with the rotor, and fluid passes through at least one of the ports and the seal when the rotor is placed in one of the plurality of configurations. In an embodiment, the second channel includes at least one arcuate surface, and the radius of the arcuate surface is less than or equal to the inner radius of the seal. In another embodiment, the radius of the arcuate surface is greater than or equal to the outer radius of the seal.

In one embodiment, the rotor is spherically shaped. In another embodiment, the rotor is cylindrically shaped.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a perspective view of a rotor used as part of a multi-port valve assembly, according to embodiments of the present invention;

FIG. 4 is a sectional view taken along lines 4-4 of FIG. 3;

DETAILED DESCRIPTION OF THE PREFERRED EMBODIMENTS

The following description of the preferred embodiment(s) is merely exemplary in nature and is in no way intended to limit the invention, its application, or uses.

Figure 1:
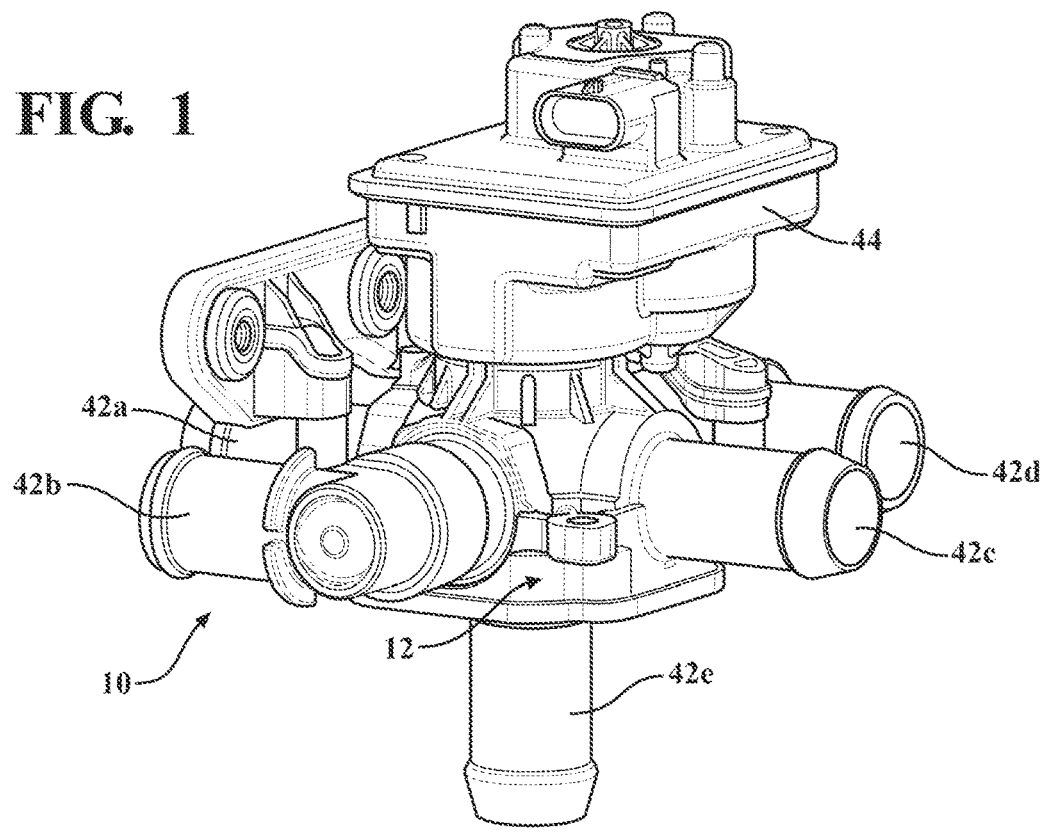
FIG. 1 is a perspective view of a multi-port valve assembly, according to embodiments of the present invention.
Figure 2:
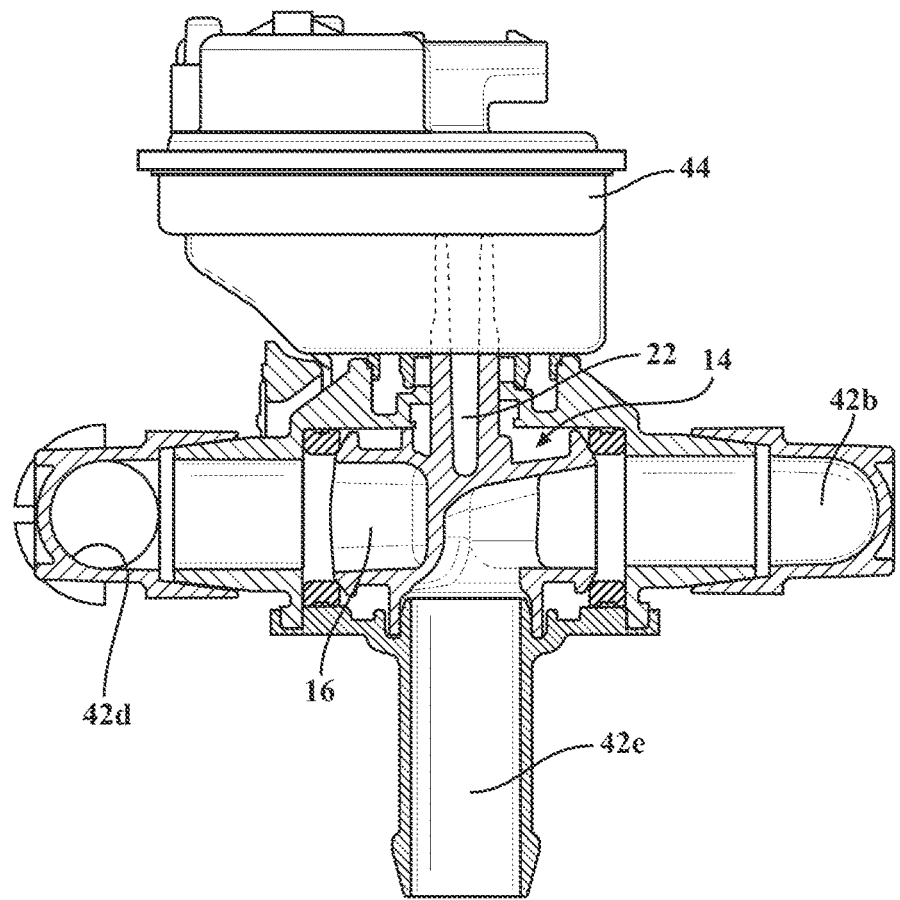
FIG. 2 is a sectional side view of a multi-port valve assembly, according to embodiments of the present invention.
Figure 5:
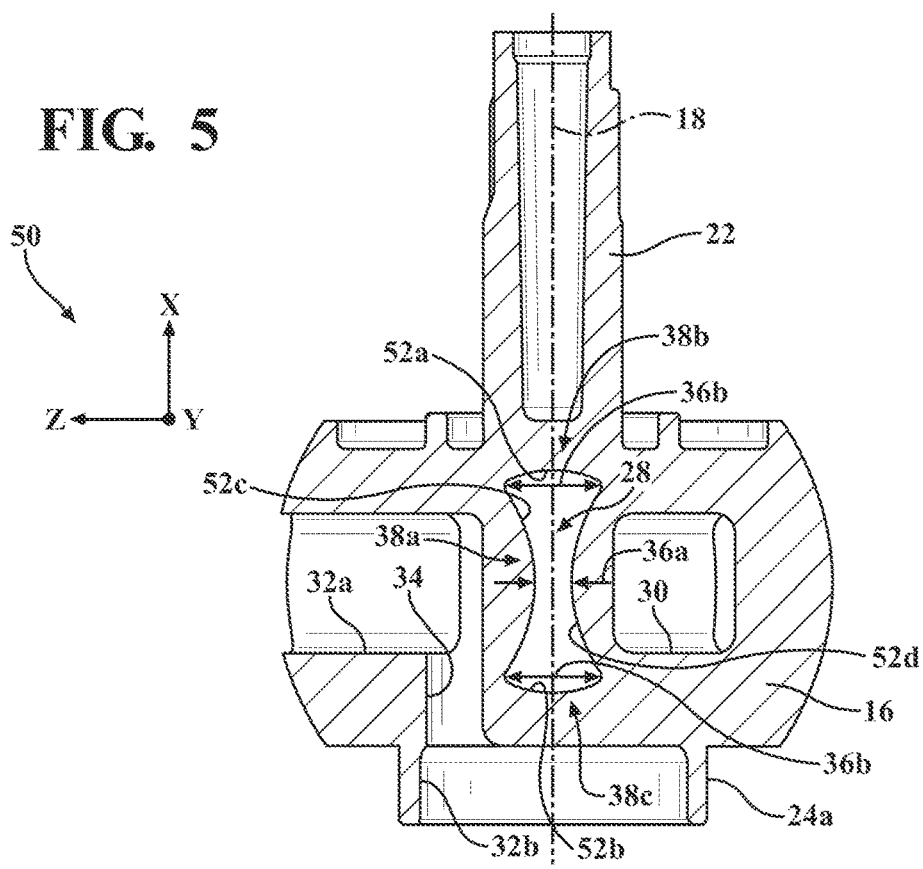
FIG. 5 is a first sectional view taken along lines 5-5 of FIG. 3.
Figure 6:
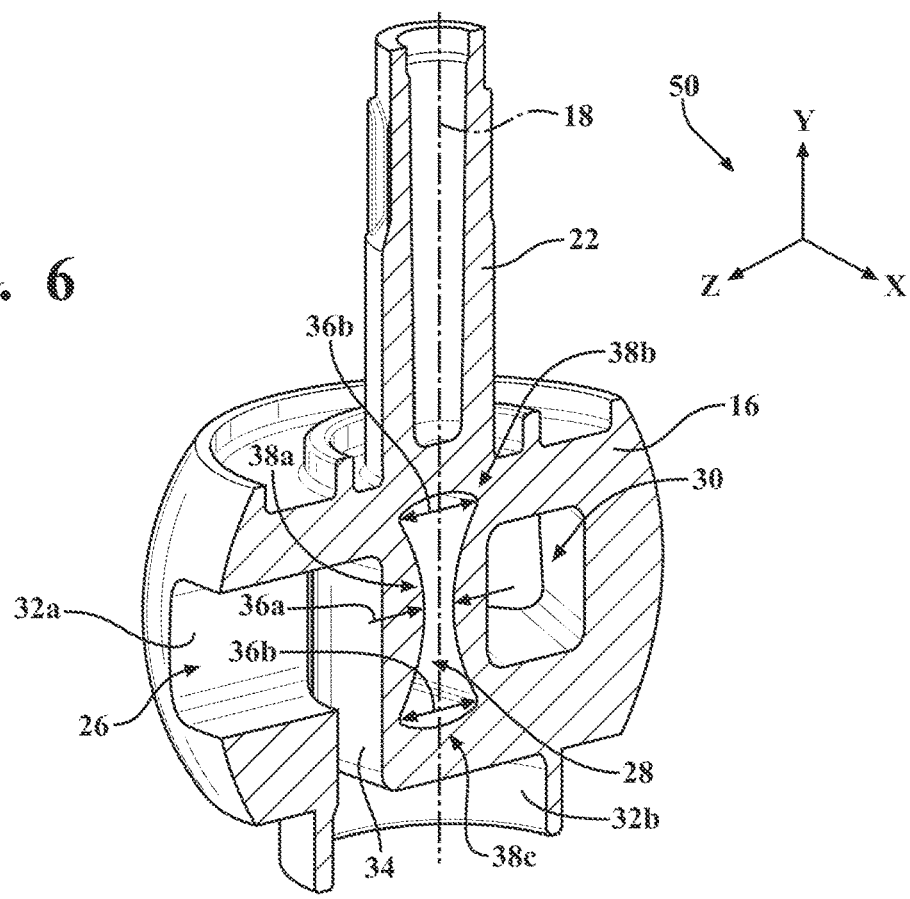
FIG. 6 is a second sectional view taken along lines 5-5 of FIG. 3.

A multi-port valve assembly according to the present invention is shown in FIGS. 1-11 generally at 10. Referring to FIGS. 1-2, the valve assembly 10 includes a housing, shown generally at 12, and inside the housing 12 is a cavity, shown generally at 14. Located in the cavity 14 is a valve member, which in this embodiment is a rotor, shown generally at 16. Referring to FIGS. 3-6, the rotor 16 is able to rotate about an axis 18, and includes external gear teeth 20, formed as part of an extension 22. The extension 22 is integrally formed with a body portion 24, and the body portion 24 has a plurality of channels which provide multiple flow paths through the rotor 16. In this embodiment, there is a first channel, shown generally at 26, a second channel, shown generally at 28, and a third channel, shown generally at 30.

The first channel 26, the second channel 28, and the third channel 30 are fluidically isolated from one another (i.e., not in fluid communication with one another). The first channel 26, the second channel 28, and the third channel 30 extend through the body portion 24, such that each channel 26,28, 30 is surrounded by the body portion 24.

Referring generally to FIGS. 3-11, the first channel 26 includes a first aperture 32a in fluid communication with a second aperture 32b. The first aperture 32a extends through the body portion 24 perpendicular to the axis 18. Integrally formed with the body portion 24 is an outer wall 24a, and the second aperture 32b extends through the outer wall 24a such that the second aperture 32b extends substantially parallel to the axis 18, and the axis 18 extends through the center of the second aperture 32b. The first aperture 32a is therefore perpendicular to the second aperture 32b. Extending between and in fluid communication with the first aperture 32a and the second aperture 32b is an intermediate aperture 34, which has a smaller cross-sectional area compared to the first aperture 32a and the second aperture 32b. The first aperture 32a is also perpendicular to the intermediate aperture 34, such that the axis 18 and the intermediate aperture 34 are substantially parallel to one another. The intermediate aperture 34 is a part of the first channel 26 and is formed as part of the body portion 24 such that the intermediate channel 34 is offset from the axis 18.

Disposed within the housing 12 is a plurality of seals 46a,46b,46c,46d,46e. Each seal 46a,46b,46c,46d,46e is disposed in a corresponding groove formed as part of one of the ports 42a,42b,42c,42d,42e, and the body portion 24 of the rotor 16 is in sliding contact with each of the seals 46a,46b, 46c,46d,46e, preventing leakage.

The second channel 28 is substantially straight, and extends through the body portion 24. The second channel 28 is located between the first channel 26 and the third channel 30. The second channel 28 also has areas which have varying widths. More specifically, the middle area, shown generally at 38a, of the second channel 28 has a width 36a, which is narrower than the outer areas, shown generally at 38b,38c, which have wider widths 36b. The axis 18 extends through the second channel 28. The second channel 28 also includes an upper arcuate surface 52a, a lower arcuate surface 52b, a first side arcuate surface 52c, and a second side arcuate surface 52d. The arcuate surfaces 52a,52b have a radius which corresponds to the inner radius of each of the seals 46a,46b,46c,46d, and in an embodiment, the arcuate surfaces 52a,52b have a radius which is less than the inner radius of each of the seals 46a,46b,46c,46d. The side arcuate surfaces 52c,52d have a radius which corresponds to the outer radius of each of the seals 46a,46b,46c,46d, and in an embodiment, the arcuate surfaces 52a,52b have a radius which is greater than the outer radius of each of the seals 46a,46b,46c,46d. The shape of each of the arcuate surfaces 52a,52b,52c,52d ensures that there is little to no overlap between the second channel 28 and the seals 46a,46b,46c, 46d, when the rotor 16 is placed in various configurations. This prevents leakage around the seals 46a,46b,46c,46d.

Figure 8:
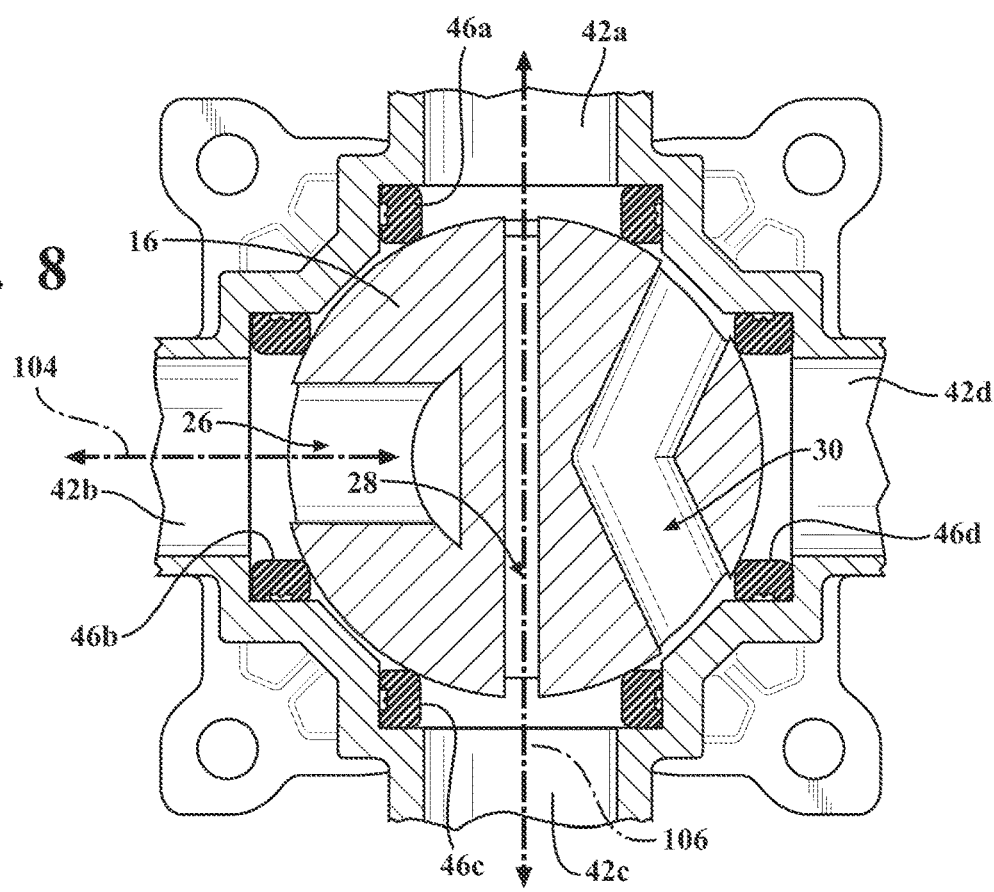
FIG. 8 is a sectional top view of a multi-port valve assembly in a second configuration, according to embodiments of the present invention.
Figure 9:
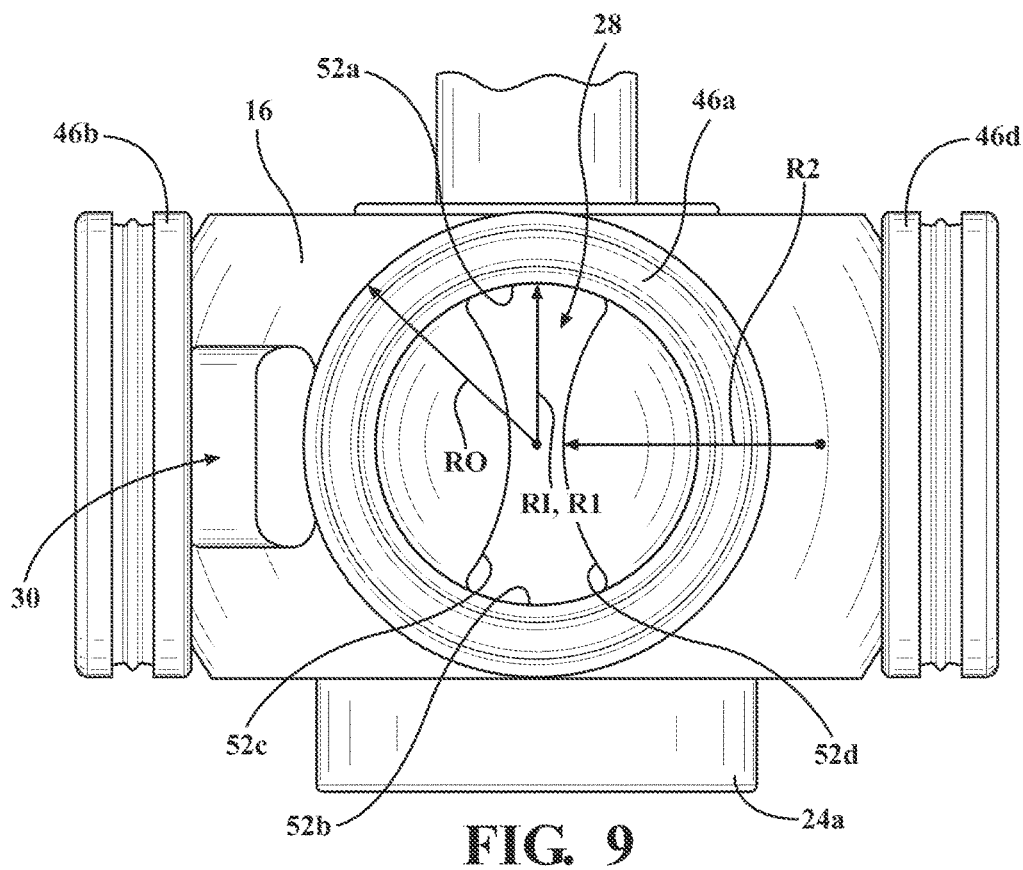
FIG. 9 is a side view of a rotor and seals used as part of a multi-port valve assembly, according to embodiments of the present invention.
Figure 10:
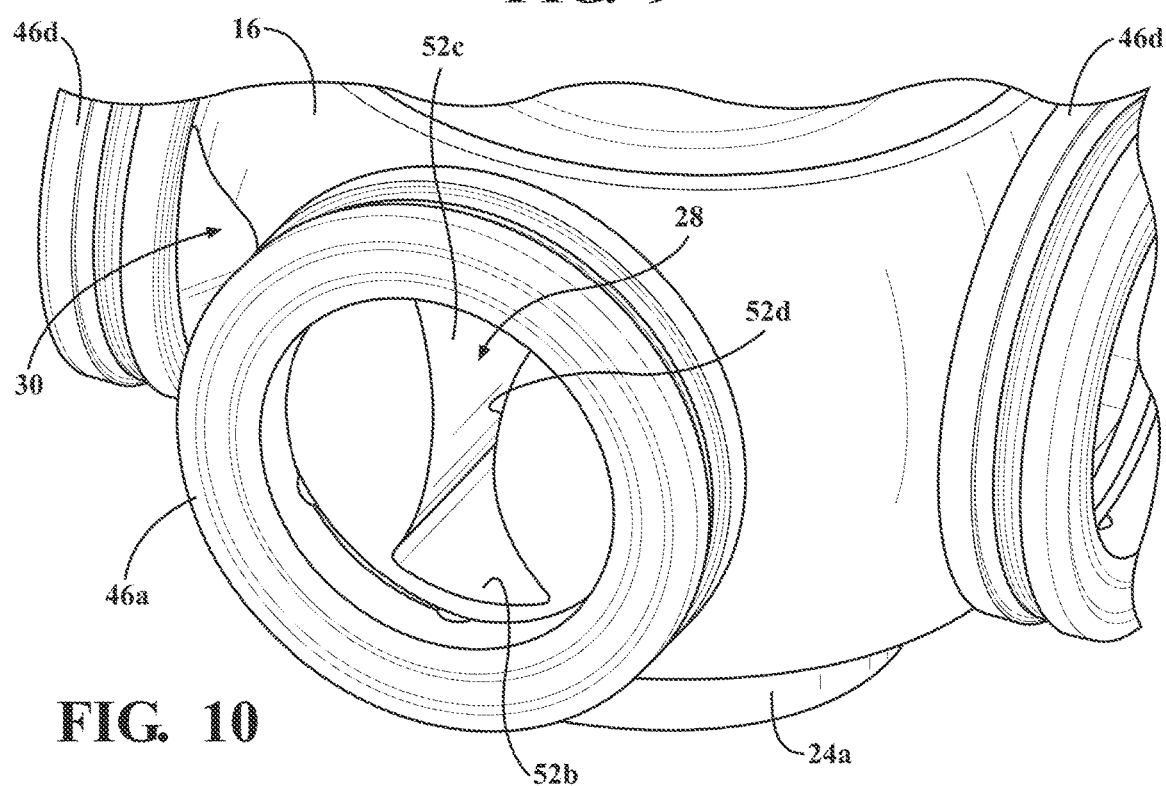
FIG. 10 is a perspective view of a rotor and seals used as part of a multi-port valve assembly, according to embodiments of the present invention.

More specifically, the arcuate surfaces 52a,52b each have the same corresponding radius R1, and the side arcuate surfaces 52c,52d have the same corresponding radius R2, where the first radius R1 is different from the second radius R2. Each seal 46a,46b,46c,46d has an inner radius RI and an outer radius RO. In this embodiment, the first radius R1 approximately equal to the inner radius RI to ensure that when the rotor 16 is placed in the second configuration shown in FIGS. 8-10, where the first port 42a is in fluid communication with the third port 42c through the second channel 28, or another configuration, where the second port 42b is in fluid communication with the fourth port 42d through the second channel 28, the fluid is able to flow through the second channel 28, and there is no leakage around the seals 46a,46b,46c,46d because the corresponding seal 46a,46b,46c,46d has the desired contact with the body portion of the rotor 16. Furthermore, the radius R1 of each of the arcuate surfaces 52a,52b is substantially aligned with the radius RI of each of the seals 46a,46c, as shown in FIGS. 8-10, when the rotor 16 is placed in the second configuration. The radius R1 of each of the arcuate seals 52a,52b is also substantially aligned with the radius RI of each of the seals 46b,46d when the rotor 16 is placed in another configuration, where the second port 42b is in fluid communication with the fourth port 42d through the second channel 28.

In an alternate embodiment, the first radius R1 may be less than the inner radius RI, which reduces the size of the second channel 28, and provides for a different flow rate through the second channel 28.

Figure 7:
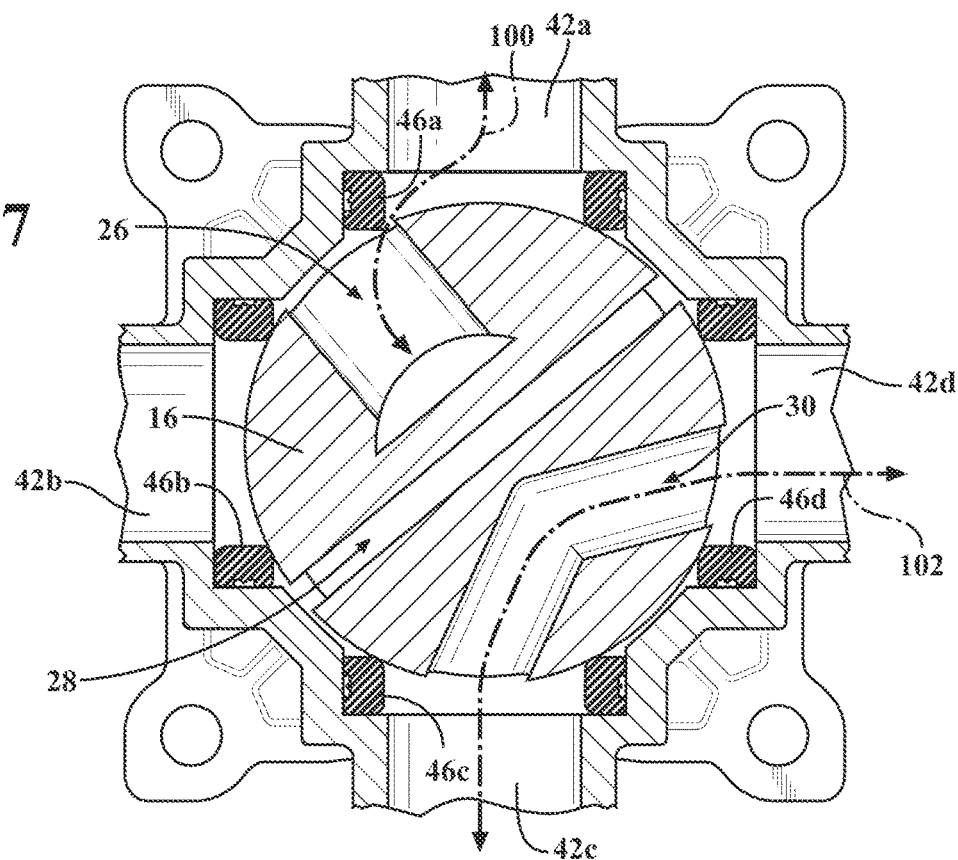
FIG. 7 is a sectional top view of a multi-port valve assembly in a first configuration, according to embodiments of the present invention.
Figure 11:
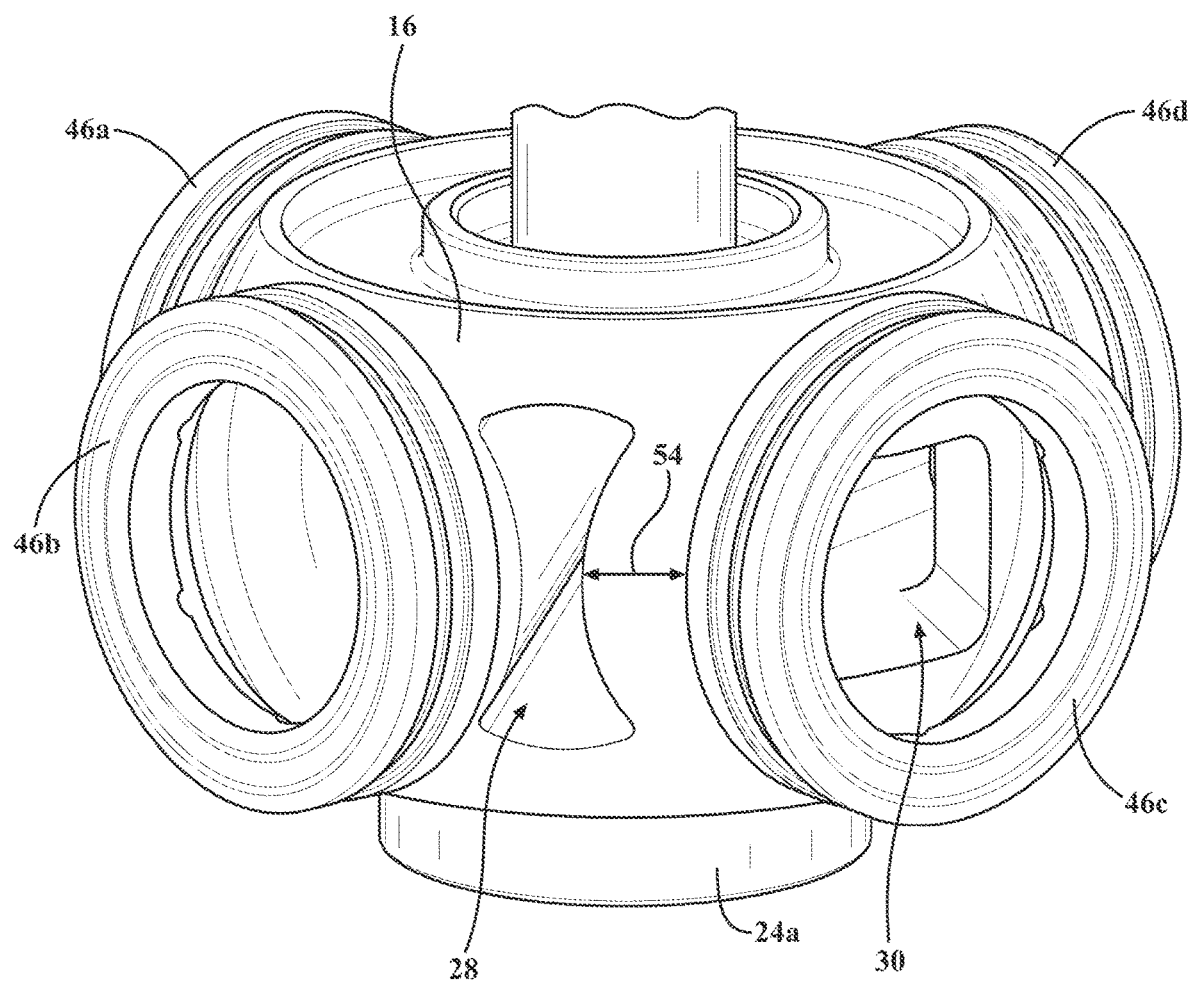
FIG. 11 is an enlarged perspective view of a rotor and seals used as part of a multi-port valve assembly, according to embodiments of the present invention.

The second radius R2 is approximately equal to the outer radius RO such that when the rotor 16 is in the configuration shown in FIG. 7 or 11, or another configuration where there is no flow path through the second channel 28, there is no leakage around the seals 46a,46b,46c,46d because the corresponding seal 46a,46b,46c,46d has the desired contact with the body portion of the rotor 16. It is also shown in FIGS. 7 and 11 that there is a clearance 54, which is the amount of rotation the rotor 16 may be subjected to, such that the second channel 28 remains between the seals 46b,46c, and no fluid passes through the second channel 28. In this embodiment, the clearance is 6°, but it is within the scope of the invention that the clearance 54 may be more or less, depending upon the size of the rotor 16, the second channel 28, and the seals 46a,46b,46c,46d.

In an alternate embodiment, the second radius R2 may be greater than the outer radius RO, which reduces the size of the second channel 28, increases the angle of the clearance 54, and provides for a different flow rate through the second channel 28.

The third channel 30 is an angled channel, and the third channel 30 includes a first aperture 30a which is integrally formed as part of the body portion 24, which is positioned at an angle 40 relative to a second aperture 30b, which is also integrally formed as part of the body portion 24. The axes are shown generally at 50 in FIGS. 3-6, it is seen in FIGS. 3-6 that the first channel 26 directs flow between the x-z plane and the y-z plane, and the second channel 28 and the third channel 30 direct flow only in the x-z plane. In this embodiment, the angle 40 of the first aperture 30a relative to the second aperture 30b is greater than 90°, but it is within the scope of the invention that the angle 40 may be larger or smaller. The angle 40 may be changed such that the angular distance 56 between the apertures 30a,30b may be more or less, allowing the rotor 16 to achieve various desired flow paths and maintain proper sealing.

Integrally formed with the housing 12 are numerous ports. More specifically, there is a first port 42a, a second port 42b, a third port 42c, a fourth port 42d, and a fifth port 42e. The rotor 16 is rotated in the housing 12 about the axis 18 by an actuator, where the actuator drives a gear train, and the gear train includes a gear member in mesh with the external gear teeth 20. The actuator and gear train are disposed in a separate housing 44. The extension 22 extends into the housing 44 such that the external gear teeth 20 are in mesh with the gear member of the gear train.

In operation, the rotor 16 is changed to various configurations, and two examples of these configurations are shown in FIGS. 7-8. In FIG. 7, the valve assembly 10 is placed in a first configuration, where the first port 42a is in fluid communication with the fifth port 42e through the first channel 26 to create a first flow path 100, such that there is flow between the first port 42a and the fifth port 42e. The fourth port 42d is in fluid communication with the third port 42c through the third channel 30 to create a second flow path 102, such that there is flow between the third port 42c and the fourth port 42d, and there is no flow path through the second port 42b or the second channel 28.

In FIG. 8, the valve assembly 10 is placed in a second configuration, where the second port 42b is in fluid communication with the fifth port 42e through the first channel 26 to create a third flow path 104, such that there is flow between the second port 42b and the fifth port 42e. The first port 42a is in fluid communication with the third port 42c through the second channel 28 to create a fourth flow path 106, such that there is flow between the first port 42a and the third port 42c, and there is no flow path through the fourth port 42d or the third channel 30.

The rotor 16 may be placed in other configurations as well. In some configurations, the first channel 26 is able to provide fluid communication between the fifth port 42e and any one of the first port 42a, the second port 42b, the third port 42c, or the fourth port 42d.

Some of the configurations of the rotor 16 also include the first port 42a being in fluid communication with the third port 42c through the second channel 28 as described above, and another configuration where the second port 42b is in fluid communication with the fourth port 42d through the second channel 28.

Some of the configurations of the rotor 16 also include the third channel 30 placing the fourth port 42d in fluid communication with the third port 42c as described above, and also include the third channel 30 placing the first port 42a in fluid communication with the second port 42b, the third channel 30 placing the second port 42b in fluid communication with the third port 42c, and third channel 30 placing the first port 42a in fluid communication with the fourth port 42d.

As shown in FIGS. 7-8, multiple flow paths are achieved using the rotor 16 being placed in the various configurations, and additional flow paths are achieved using the various configurations described above, with each of the configurations having multiple flow paths using the channels 26,28, 30.

Figure 12:
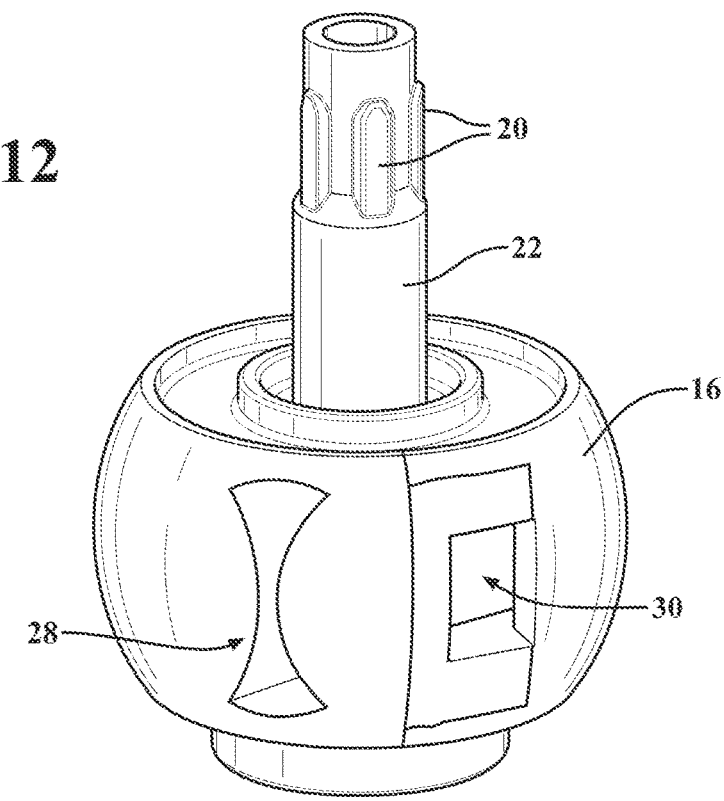
FIG. 12 is a perspective view of an alternate embodiment of a rotor used as part of a multi-port valve assembly, according to an alternate embodiment of the present invention.
Figure 13:
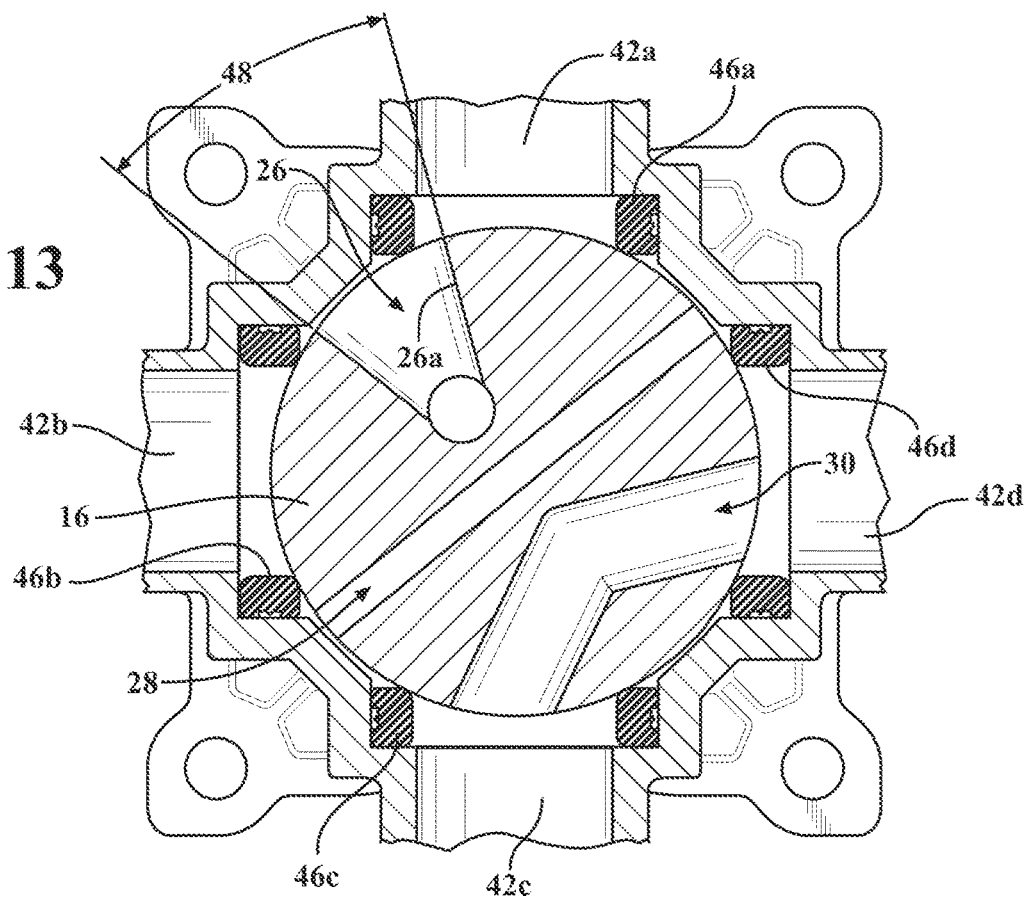
FIG. 13 is a sectional top view of an alternate embodiment of a multi-port valve assembly in a first configuration, according to an alternate embodiment of the present invention.
Figure 14:
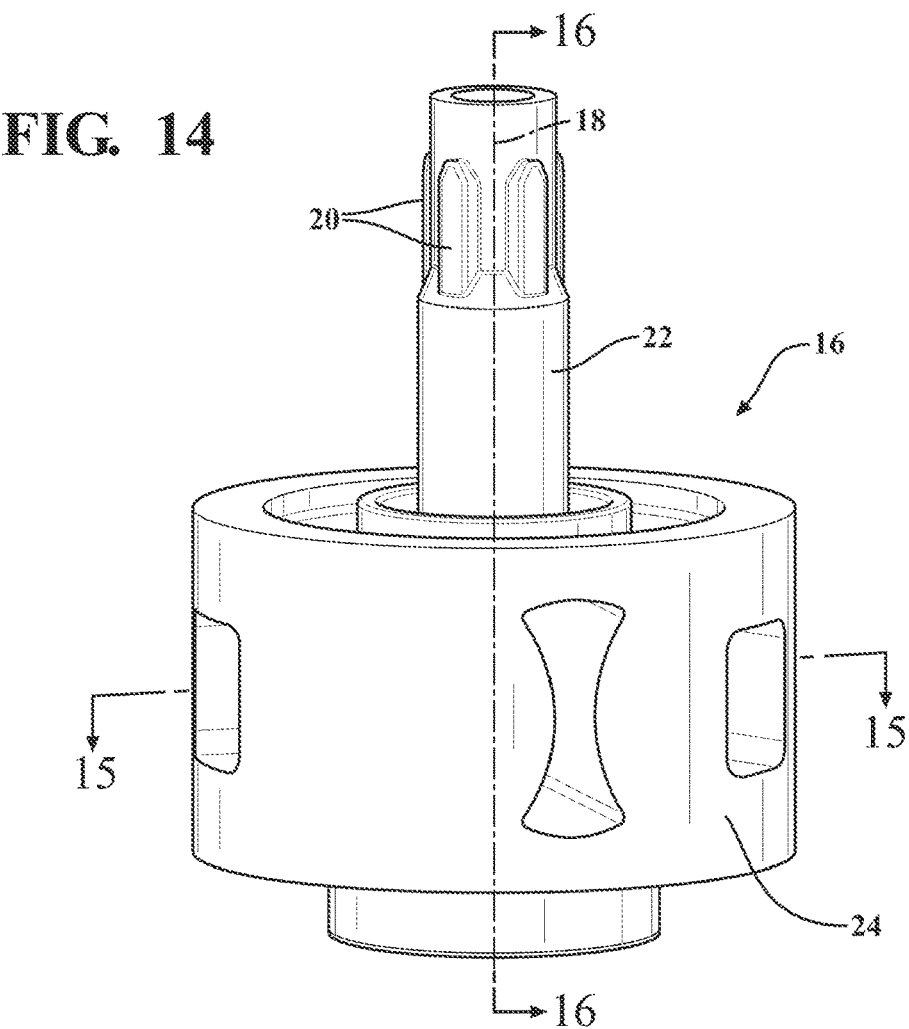
FIG. 14 is a perspective view of a second embodiment of a rotor used as part of a multi-port valve assembly, according to embodiments of the present invention.
Figure 15:
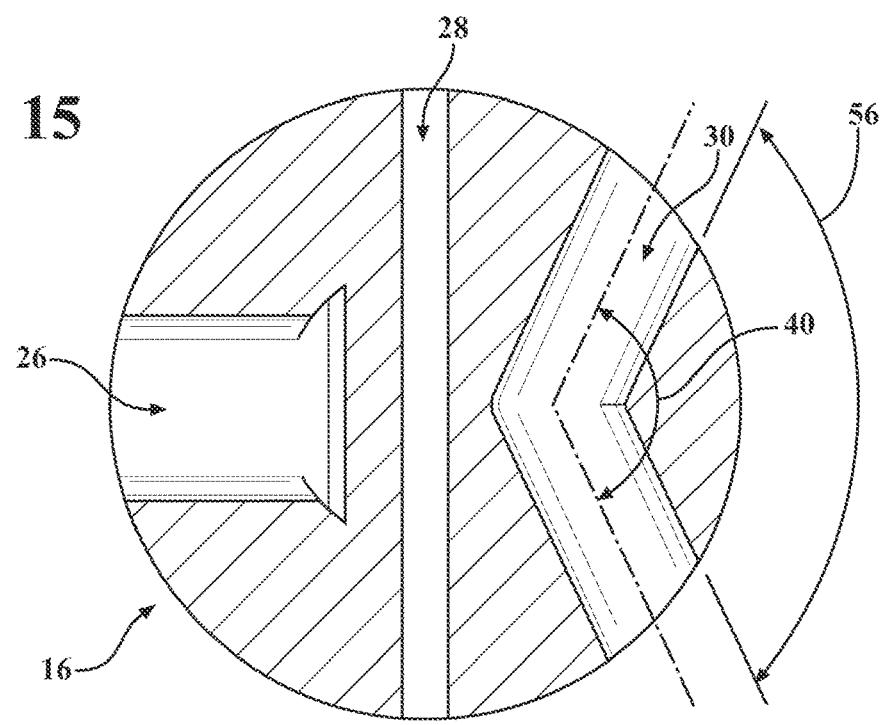
FIG. 15 is a sectional view taken along lines 15-15 of FIG. 14.
Figure 16:
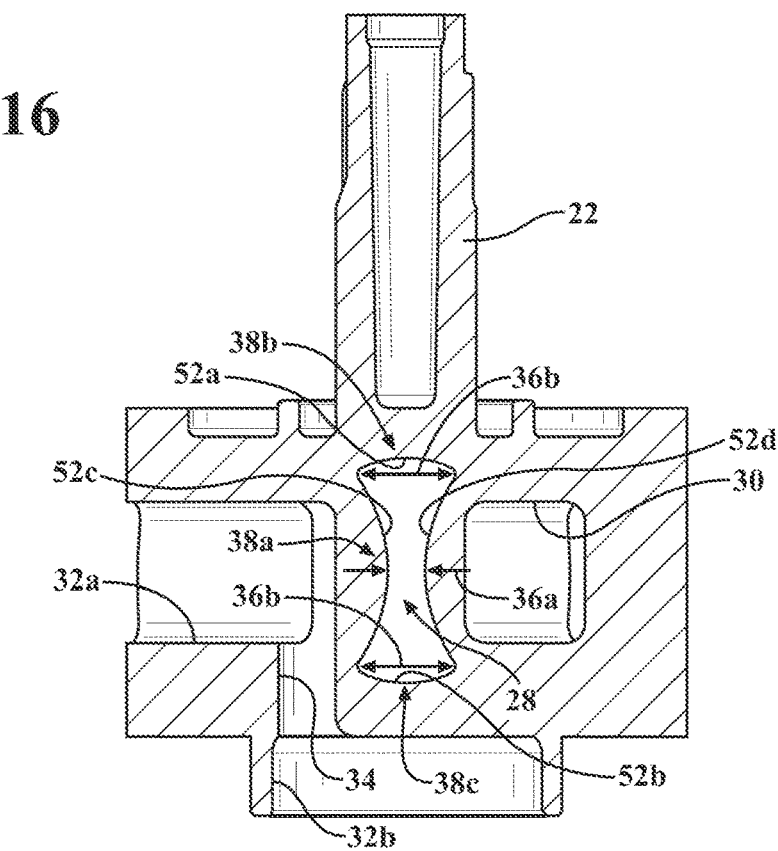
FIG. 16 is a first sectional view taken along lines 16-16 of FIG. 14.
Figure 17:
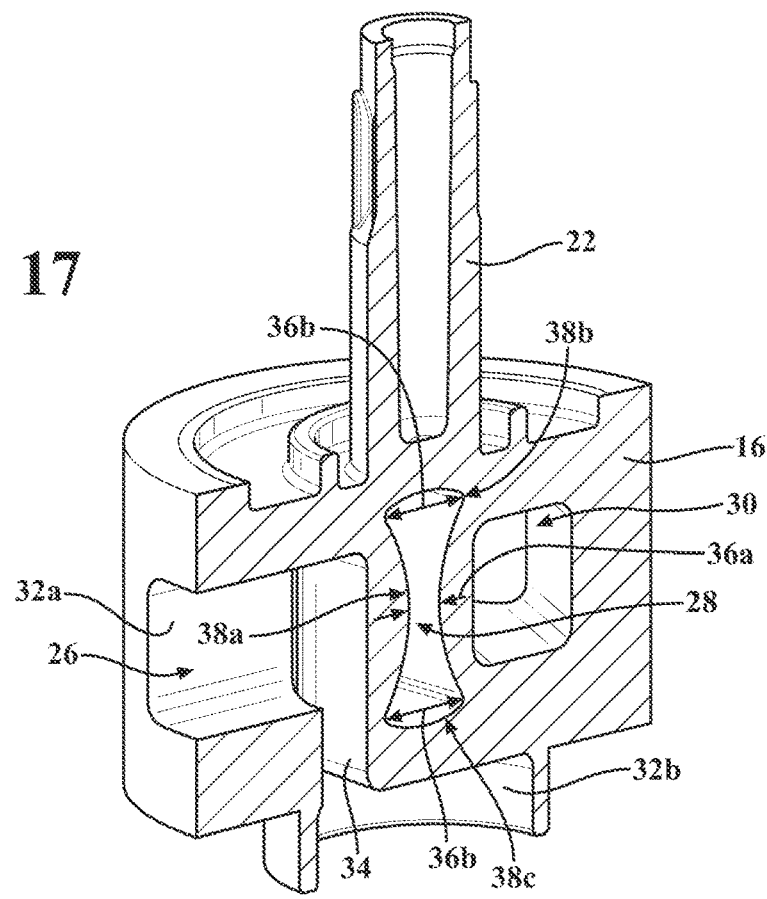
FIG. 17 is a second sectional view taken along lines 16-16 of FIG. 14.

An alternate embodiment of the invention is shown in FIGS. 12-13, with like numbers referring to like elements. In this embodiment, the first channel 26 has a tapered portion 26a, which facilitates the flow of fluid between the fifth port 42e and any one of the first port 42a, the second port 42b, the third port 42c, or the fourth port 42d.

In another alternate embodiment, the tapered portion 26a is shaped such that the tapered portion 26a is able to facilitate the flow between the fifth port 42e and two of the remaining ports 42a,42b,42c,42d. For example, the shape of the tapered portion 26a may be such that fluid may flow between the fifth port 42e and the first port 42a and fourth port 42d.

The tapered portion 26a is formed to have an angle 48, the angle 48 of the tapered portion 26a may be changed to alter the flow capability of the first channel 26, and to accommodate various flow rates.

Another embodiment of the present invention is shown in FIGS. 14-17, with like numbers referring to like elements. In this embodiment, the body portion 24 of the rotor 16 is cylindrically shaped, as opposed to the previous embodiments, where the body portion 24 is spherically shaped. The rotor 16 have the cylindrically shaped body portion 24 is located in a housing having a cavity which corresponds to the shape of the rotor 16. It is within the scope of the invention that other shapes of the rotor 16 may be possible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotor which is part of a multi-port valve assembly, the rotor comprising:
   a body portion rotatable about an axis, the body portion in contact with at least one seal having an inner radius and an outer radius;
   a first channel, at least part of the first channel integrally formed as part of the body portion, the first channel further comprising:
      a first aperture which extends through the body portion perpendicular to the axis;
      an intermediate aperture which extends through the body portion parallel to and offset from the axis, the intermediate aperture in fluid communication with the first aperture;
      a second aperture in fluid communication with the intermediate aperture;
   an outer wall which extends away from the body portion in a direction parallel to the axis, the second aperture extending through the outer wall;
   a second channel, the second channel fluidically isolated from the first channel, the second channel further comprising:
      a plurality of arcuate surfaces, each of the plurality of arcuate surfaces having a radius which is less than or equal to the inner radius of the at least one seal;
      at least one side arcuate surface having a radius which is equal to or greater than the outer radius of the at least one seal;
   a third channel integrally formed as part of the body portion, the third channel fluidically isolated from the first channel and the second channel;
   wherein the second channel is located between the first channel and the third channel, and the rotor is placed in one of a plurality of configurations such that each of the plurality of configurations includes at least two flow paths using two of the first channel, the second channel, or the third channel, and fluid passes through the at least one seal when the rotor is placed in one of the plurality of configurations.

2. The rotor of claim 1, the second channel further comprising:
   a first outer area, one of the plurality of arcuate surfaces being part of the first outer area;
   a second outer area, another of the plurality of arcuate surfaces being part of the second outer area; and
   a middle area which is narrower in width compared to the first outer area and the second outer area;
   wherein the first outer area, the second outer area, and the middle area extend through the body portion.

3. The rotor of claim 1, the third channel further comprising:
   a first aperture integrally formed as part of the body portion; and
   a second aperture integrally formed as part of the body portion, the second aperture in fluid communication with the first aperture;
   wherein the first aperture and the second aperture are positioned at an angle relative to one another.

4. The rotor of claim 1, wherein the body portion is a portion of a sphere.

5. The rotor of claim 1, wherein the body portion is cylindrically shaped.

6. The rotor of claim 1, the multi-port valve assembly further comprising:
   a housing having a cavity, the rotor at least partially disposed in the cavity, the at least one seal disposed in the cavity;
   a plurality of ports integrally formed as part of the housing; and
   wherein the rotor is placed in one of the plurality of configurations relative to the plurality of ports and the housing such that each of the plurality of configurations includes the at least two flow paths using one of the first channel, the second channel, or the third channel and provides fluid communication between two of the plurality of ports.

7. An apparatus, comprising:
   a multi-port valve assembly, including:
      a housing;
      a plurality of ports, each of the plurality of ports formed as part of the housing;
      a rotor disposed in the housing, and the rotor rotatable about an axis, the rotor selectively in fluid communication with at least one of the plurality of ports;
      at least one seal having an inner radius and an outer radius, the at least one seal located in the housing such that the at least one seal is in sliding contact with the rotor;
      a plurality of channels integrally formed as part of the rotor, the plurality of channels further comprising:
         a first channel integrally formed as part of the rotor, the first channel further comprising:
            a first aperture, the first aperture extends through a body portion of the rotor perpendicular to the axis;
            an intermediate aperture in fluid communication with the first aperture, the intermediate aperture extends through the body portion of the rotor parallel to and offset from the axis;
a second aperture in fluid communication with the intermediate aperture, the intermediate aperture extends between the first aperture and the second aperture, the intermediate aperture has a smaller cross-sectional area compared to the first aperture and the second aperture, and the first aperture is perpendicular to the intermediate aperture and the second aperture;
a second channel integrally formed as part of the rotor such that the second channel is substantially straight and extends through the rotor in between the first channel and the third channel, the second channel further comprising:
at least one arcuate surface having a radius which is less than or equal to the inner radius of the at least one seal;
at least one side arcuate surface having a radius which is equal to or greater than the outer radius of the at least one seal;
at least one outer area; and
a middle area having a narrower width than the at least one outer area;
a third channel integrally formed as part of the rotor, and the first channel, the second channel, and the third channel being fluidically isolated from one another;

an outer wall extending away from the body portion of the rotor in a direction parallel to the axis, the second aperture extending through the outer wall;
at least two flow paths formed by the orientation of the rotor relative to the housing and the plurality of ports;
wherein the rotor is placed in one of a plurality of configurations relative to the plurality of ports and the housing such that each of the plurality of configurations includes the at least two flow paths using two of the plurality of channels, and fluid passes through at least one of the plurality of ports and the at least one seal when the rotor is placed in one of the plurality of configurations.

8. The apparatus of claim 7, the third channel further comprising an angled channel which provides fluid communication between two of the plurality of ports.

9. The apparatus of claim 8, the third channel further comprising:
a first aperture integrally formed as part of the body portion of the rotor; and
a second aperture integrally formed as part of the body portion of the rotor;
wherein the first aperture is in fluid communication with the second aperture.

10. The apparatus of claim 7, wherein a portion of the rotor is a portion of a sphere.

11. The apparatus of claim 7, wherein the rotor is cylindrically shaped.

* * * * *